Oct. 15, 1968   R. D. HEES   3,405,659
HONEYCOMB LOAD SPACER
Filed Dec. 30, 1966   2 Sheets-Sheet 1
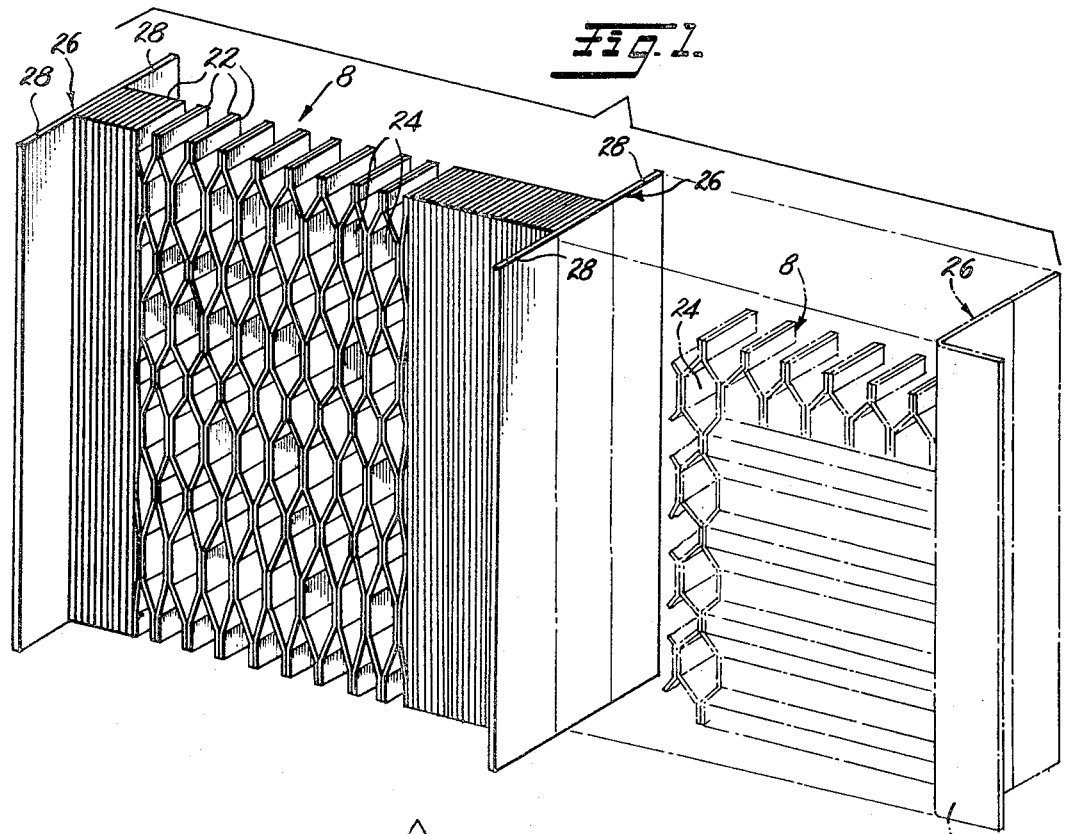
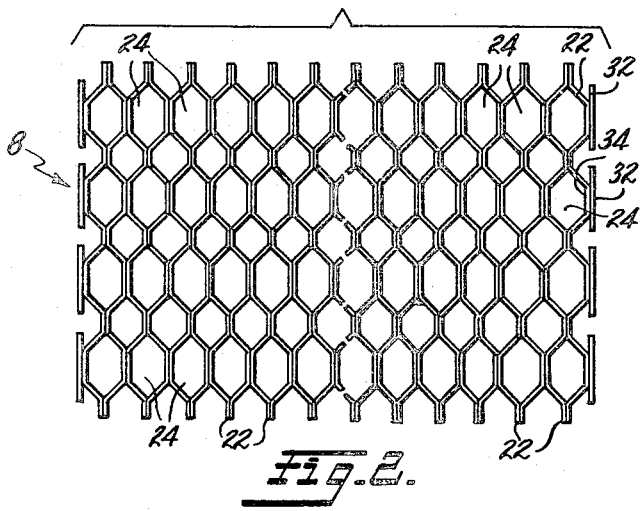
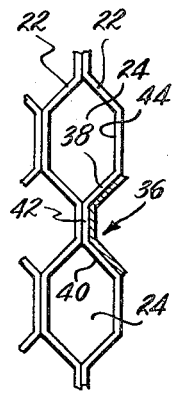
INVENTOR.
RONALD D. HEES
BY Bacon & Thomas
ATTORNEYS

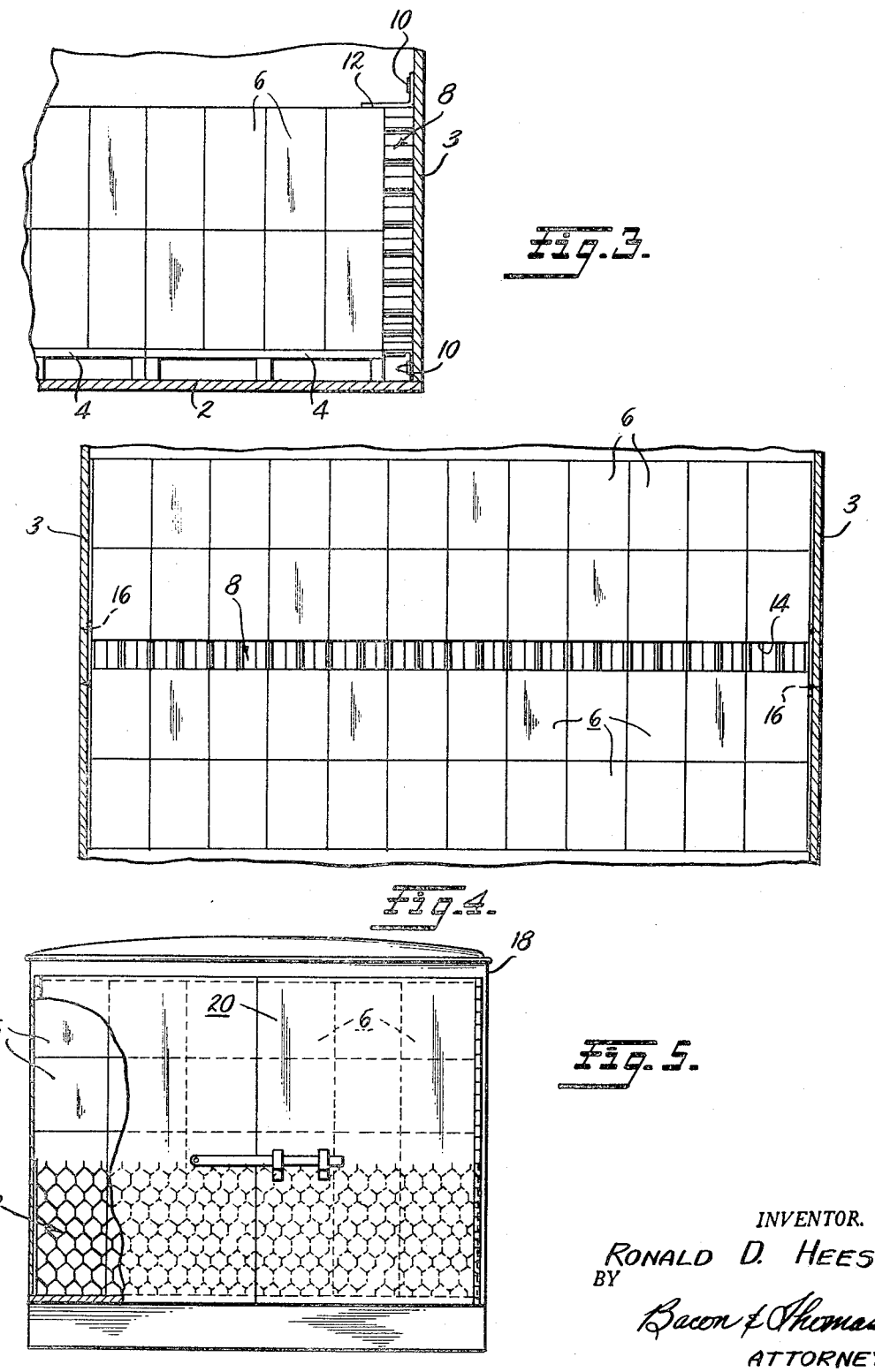

United States Patent Office 3,405,659
Patented Oct. 15, 1968

3,405,659
HONEYCOMB LOAD SPACER
Ronald D. Hees, Plymouth, Mich., assignor to Narad, Inc., Wayne, Mich., a corporation of Michigan
Filed Dec. 30, 1966, Ser. No. 606,229
2 Claims. (Cl. 105—369)

ABSTRACT OF THE DISCLOSURE

A spacer for filling spaces, in a freight shipping vehicle or container, not occupied by articles of freight, and being in the form of a lightweight expandable honeycomb structure.

Background of the invention

The present invention relates to dunnage devices for loads of freight and is particularly useful as a dunnage device for palletized loads in freight cars, trucks and the like and which may be stored or shipped to the point of use in a compact and collapsed condition then expanded to be put in use, and thereafter destroyed or discarded if desired.

The efficient stowage of articles of freight in a freight car, truck or the like for transport heretofore required careful placement of the articles to minimize shifting thereof and possible damage when in transit. However, the dimensions of the articles rarely permit exactly and completely filling the available space and voids in the cargo space almost always result. The practice has been to construct relatively large bulky dunnage devices of lumber or the like, after the load is in place. The problem of load securement is particularly troublesome if it is desired to load the vehicle with stacks of cargo by placing the stacks on pallets and positioning the pallets in the vehicle by means of conventional fork lift trucks.

Summary

The aforementioned problems have been solved by applicant by the present invention, wherein a load-spacing device is constructed in the form of an expandable honeycomb of sheet material, preferably corrugated paper. The basic honeycomb structure is formed as a flat stack which can then be extended or expanded to define a honeycomb slab. The end trips of the stack comprising the honeycomb structure have affixed thereto laterally extending tabs, preferably of the same or somewhat stiffer material. Thus, a number of palletized loads may be placed in a boxcar, for example, and it will usually be found that the load does not extend completely and exactly from side wall to side wall. The excess space may be left between the load and one side wall or may be spaced from the side walls and between selected pallets. When the load to one side of the space has been placed in position, the product of the invention is placed against the side of the load with one of the end tabs engaging an edge of the load articles and the other end of the honeycomb pad can then be drawn along the space to be occupied thereby and expanded sufficiently to extend to the other end of the row of pallets whereupon the tabs at that end may be engaged with the end of the load and thus hold the expanded honeycomb slab in extended condition and in the position it is to finally occupy. The tabs at the ends of the stack retain the spacer in this expanded condition to permit placement of the remaining articles of the load in abutment therewith. As will be obvious, the sheet material defining the walls of the honeycomb cells extend across the space to be occupied and thus present their edges to the load items on both sides thereof, which results in an extremely strong yet lightweight and inexpensive structure.

In one form of the invention the end tabs referred to may extend the full width of the slab, being secured to each honeycomb cell. This arrangement results in unequal expansion of the cells and limits the extent to which a structure can be expanded. In a second form, tabs are of limited extent and are secured to only that portion of an end strip which defines a wall of only a single cell. Thus, even the end cell of the structure may be fully expanded without any restrictions imposed by the holding tabs.

Throughout the description, reference to a honeycomb structure or a honeycomb slab will refer to the well known arrangement wherein a plurality of sheets or strips of foldable material are arranged to form a stack with the adjacent sheets or strips secured to each other at spaced and staggered positions so that expansion of the stack will result in the formation of a multiplicity of open-ended cells defined by the sheet material and to cellular structures comprising normally straight strips of sheet material arranged edgewise in crossing relation to define four-sided cells, the strips being notched with their notches interengaging, in a well known manner. Such honeycomb structures are well known in many arts and a further description thereof is not deemed necessary. Preferably, the material of the honeycomb structure will be a double-faced corrugated paper board having an inner layer of corrugated paper and facing sheets on opposite sides thereof. However, the invention is not limited thereto and any other suitable material may be employed.

Brief description of the drawings

FIG. 1 is a perspective view of a partially expanded spacer according to the present invention and shown in further expanded condition by dotted lines;

FIG. 2 is a plan view of a fully expanded second embodiment of the invention;

FIG. 3 is a partial vertical sectional view of the spacer shown in position in a freight car and illustrating one manner of use;

FIG. 4 is a fragmentary horizontal sectional view through a flat car with the spacer of the present invention shown in place therein;

FIG. 5 is an end view of a truck, trailer or the like illustrating a further manner of use of the present invention; and FIG. 6 is a fragmentary view similar to a portion of FIG. 2 but showing a modified form of tab.

Description of the preferred embodiments

From the foregoing summary it is believed the general manner of use and purpose for the invention is shown.

Referring first to FIG. 3 which shows one manner of using the invention, a flatcar or the like having a floor 2 and side walls 3, is shown with a load in place therein. The load, for purpose of illustration, comprises a plurality of pallets 4 of well known construction, each having a stack of freight articles 6 thereon. As shown in the figure, the pallets and their loads do not occupy the full width of the freightcar but are spaced from a side wall 3. Prior to completing the placing of the load it is known what the dimensions of the unoccupied space will be and a honeycomb slab structure, generally indicated at 8, is selected, having a thickness substantially equal to the width of the generally planar space referred to. The end tabs of the honeycomb slab can be folded to lie against the side wall 3 and secured thereto by adhesives or by suitable fastening means 10 whereby the spacer is held in position while the final pallet is placed in position. As shown in FIG. 3, the upper tab may be folded or extended outwardly, as at 12, to overlie the top of the stack of articles 6 and thus provide support for the cellular slab 8 and to ensure its being held in expanded condition. Obviously the high strength of the honeycomb slab when positioned in the manner shown will ensure that the article 6 will be held against lateral shifting and damage and yet permits loading of the car in a rapid and efficient manner by means of fork lift trucks and the pallets 4, as described.

FIG. 4 is a horizontal sectional view through a load which may be assumed to be a plurality of stacks of articles 6 on pallets 4, as shown in FIG. 3. In this case, however, the articles 6 are of such dimension that they completely fill the flatcar between the sidewalls 3 and thus no spacers are necessary in that direction. However, the length of the articles 6 is such that they will not completely occupy the length of the car and at least one unoccupied space 14 will be present. In this instance articles 6 shown at the top of the figure can first be placed in position snugly against an end wall of the car and after any desired number of transverse rows of pallets have been loaded, a honeycomb spacer 8 may be positioned vertically in the car and expanded to extend completely across from one side wall 3 to the other. In doing so, the end tabs referred to may be slipped alongside the facing row of articles and thus hold the expanded structure in position while the remaining load articles are placed in position against the slab. If desired, the end tabs of the slab may be secured to the side walls of the car by adhesive or such fastening means as shown at 16.

FIG. 5 shows a further manner of using the present spacer in which a truck or trailer 18 or the like is provided with rear doors 20 through which the load is placed in the vehicle and removed therefrom. In FIG. 5, it is assumed that the articles of freight 6 will completely fill the available space from side to side but that a space will be left between the rearmost row of articles and the doors 20. The dimensions of this space are of course known and a honeycomb slab 8 of suitable thickness may be selected and placed in position against the articles 6 and held therein in the manner already described so that closing and locking of the doors 20 will cause the latter to abut the outer face of the slab 8 and the load will thus be securely held against shifting, even under very substantial forces. Obviously, if the articles of freight 6 do not completely fill the truck body from side to side further longitudinally extending spacers may be inserted as the load is put in place in a manner that will be obvious from review of the description of FIGS. 3 and 4.

The expandable honeycomb structures themselves are shown in FIGS. 1 and 2. In FIG. 1, the structure comprises a stack of strips 22 which are essentially flat strips but are stacked together and adhered together at staggered positions so that any one strip is adhered to the strips on both sides of it at staggered positions. Thus, the stack may be expanded as shown in FIG. 1 to define a multiplicity of honeycomb cells 24 in a well known manner. End tabs 26 are secured to the outermost strips of the stack, in FIG. 1 shown as being secured thereto throughout the length of the strips. The tabs 26, however, extend laterally beyond the sides of the stack to define extending portions 28, which are the portions arranged to engage the adjacent end faces of a row of articles in the manner already described. Preferably, the tabs 26 are arranged so that the extending portions 28 can be folded downwardly against the sides of the stacks to reduce the space occupied thereby when in collapsed form but when extended to the positions shown in FIG. 1 in full lines, they are sufficiently stiff to hold the expanded structure against collapsing, after being expanded and put in position. Clearly, either or both of the extending portions 28 may be folded lengthwise to the position shown in dotted lines at 30 for securement to a side wall of the vehicle, in the manner shown in FIG. 3.

FIG. 2 illustrates a second embodiment of the invention wherein a stack of strips 22 is constructed in exactly the same manner as described with respect to FIG. 1. The end tabs, however, do not extend the full length of the stack but compise a plurality of separate tabs 32 each being secured to only that portion of an end strip 22 which defines a side wall 34 of an end cell 24. The dimensions of the tabs 32 in the direction of length of the strips 22 is less than the distance between adjacent cell side walls so that the cells can be fully expanded to the position shown in FIG. 2 and the tabs 32 may thus approach each other without interference upon expansion of the slab. Each tab 30 will extend laterally beyond the opposite sides of the honeycomb slab and will provide extending portions like the portions 28 of FIG. 1. Of course, each end strips may be provided with only one or two such tabs 32, if desired.

The modification shown in FIG. 6 includes a basic honeycomb slab which may be identical to that shown in FIGS. 1 and 2 but instead of the end tabs 26 and/or 32, a different form of end tab is employed. As shown in FIG. 6, the end tab 36 is adhered to wall portions 38 and 40 of adjacent end cells 24 and is also adhered to the joining wall portion 42 between those two cells. Obviously, when the honeycomb slab is collapsed, the tab 36 is a flat planar structure and the projecting portions thereof may be folded against the sides of the slab to occupy less space. However, when the honeycomb slab is fully extended the tab 36 assumes the generally channel shaped configuration illustrated in FIG. 6, which imparts great rigidity to the tab and thus permits use of only one or two tabs if desired and ensures against the projecting portions of the tab folding away from their intended position even though score or fold lines may be present to permit folding those portions against the collapsed structure as already suggested. It will also be obvious that the tab 36 having angularly related planar portions may be provided by adhering suitable sheet material to only an outermost wall portion 44 of one of the cells 24 and also to the wall portion 38 thereof with or without a further portion adhered to the connecting wall 42. Such an arrangement would permit folding at least that portion of the tab secured to the outer wall 44, or as shown, the portion secured to the connecting wall 42 to extend in a direction parallel to the general plane of the expanded slab, much as shown at 30 in FIG. 1 and for securement of a side wall of a container as shown in FIG. 3. Other and further tab arrangements will be obvious to those skilled in the art.

As stated previously, the material from which the spacer of this invention is constructed is very inexpensive and can readily be cut to strips of the desired width to exactly fill the unoccupied space referred to. In addition, the slabs may be collapsed to occupy very little space for storage or shipment and yet when expanded can fill spaces of various lengths without any change in the spacer structure itself. After use, and if undamaged, the spacers may be collapsed and reused or they may be disposed of by burning or other destructive means since the cost is so modest that they are readily expendable.

What is claimed is:

1. The combination comprising: a freight container having opposed boundary walls; a plurality of discrete articles of freight in said container, said articles being arranged to leave a generally planar space, bounded on opposite sides by said articles, parallel to certain of said opposed boundary walls; a honeycomb structure of sheet material substantially filling said space with the sheet material thereof extending transversely across said space, said honeycomb structure being expandable and contractable in a direction parallel to said opposed boundary walls; and holding means at each end of said honeycomb structure and extending laterally to both sides thereof in engagement with edge portions of articles on both sides of said space to thereby prevent said honeycomb structure from contracting into said space.

2. An expandable honeycomb structure comprising: a stack of strips of sheet material, the strips of said stack being secured to adjacent strips at spaced and staggered positions whereby said stack may be expanded to define a honeycomb slab having a multiplicity of cells; at least one tab of relatively stiff sheet material secured to the outer face of each outer strip of said stack and to a plurality of adjacent cell wall portions which assume relatively angularly related positions when said stack is expanded whereby said tab then comprises angularly related planar portions defining a rigid tab structure extending laterally outwardly of said stack.

References Cited

UNITED STATES PATENTS

| | | | |
|---|---|---|---|
| 2,760,444 | 8/1956 | Pierce | 105—367 |
| 3,146,729 | 9/1964 | Langston | 105—369 |
| 3,296,059 | 1/1967 | Schwindt | 52—615 X |

FOREIGN PATENTS 625,036  6/1949  Great Britain.

DRAYTON E. HOFFMAN, *Primary Examiner.*